(No Model.) 3 Sheets—Sheet 2.
A. ZALUD.
HORSE ARRESTER.
No. 432,922. Patented July 22, 1890.
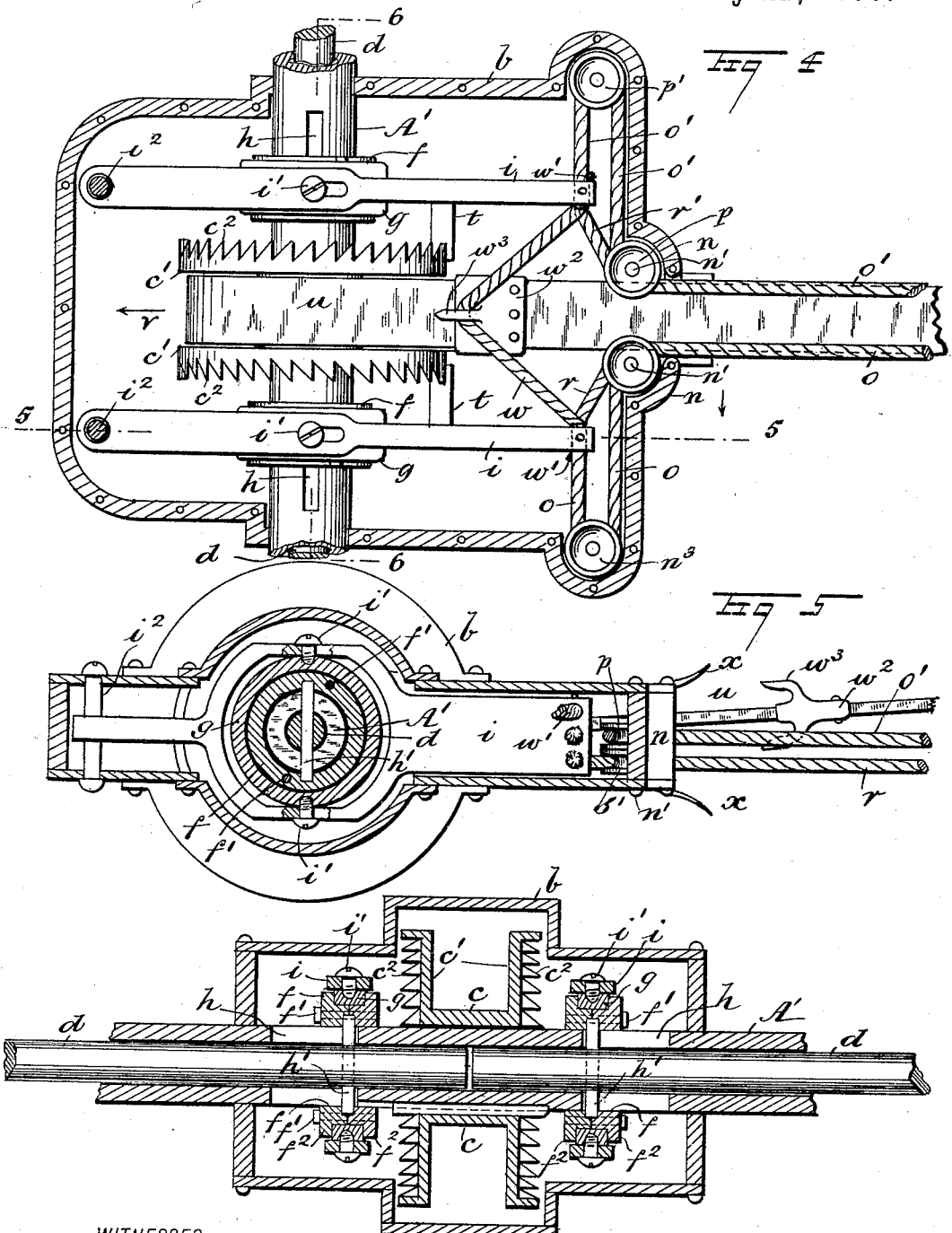
WITNESSES:
H. Walker
C. Sedgwick
INVENTOR:
A. Zalud
BY
Munn & Co.
ATTORNEYS (No Model.)  3 Sheets—Sheet 3.

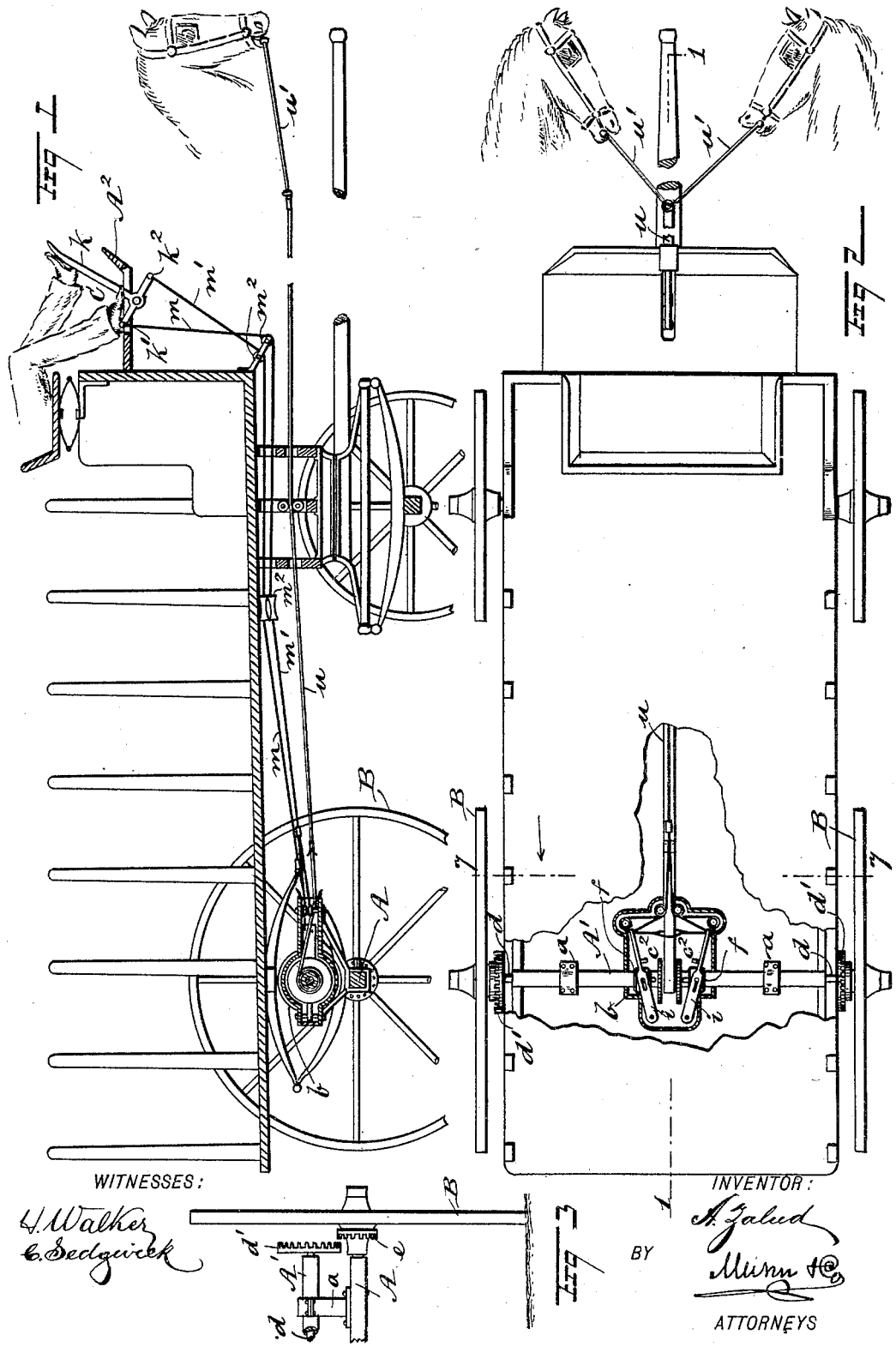

A. ZALUD.
HORSE ARRESTER.

No. 432,922.  Patented July 22, 1890.

WITNESSES:
H. Walker
C. Sedgwick

INVENTOR:
A. Zalud
BY Munn & Co.
ATTORNEYS

UNITED STATES PATENT OFFICE.

ALBERT ZALUD, OF CHICAGO, ILLINOIS.

HORSE-ARRESTER.

SPECIFICATION forming part of Letters Patent No. 432,922, dated July 22, 1890.

Application filed May 12, 1890. Serial No. 351,393. (No model.)

*To all whom it may concern:*

Be it known that I, ALBERT ZALUD, of Chicago, in the county of Cook and State of Illinois, have invented a new and useful Improvement in Horse-Arresters, of which the following is a full, clear, and exact description.

This invention relates to an improved device for stopping runaway horses that are attached to a vehicle, the object being to provide a convenient and reliable means for the speedy arrest of vicious or frightened animals that are uncontrollable by the ordinary appliances usually furnished for the purpose.

To this end the invention consists in the construction and combination of parts, as hereinafter described, and indicated in the claims.

Reference is to be had to the accompanying drawings, forming a part of this specification, in which similar letters of reference indicate corresponding parts in all the views.

Figure 7:
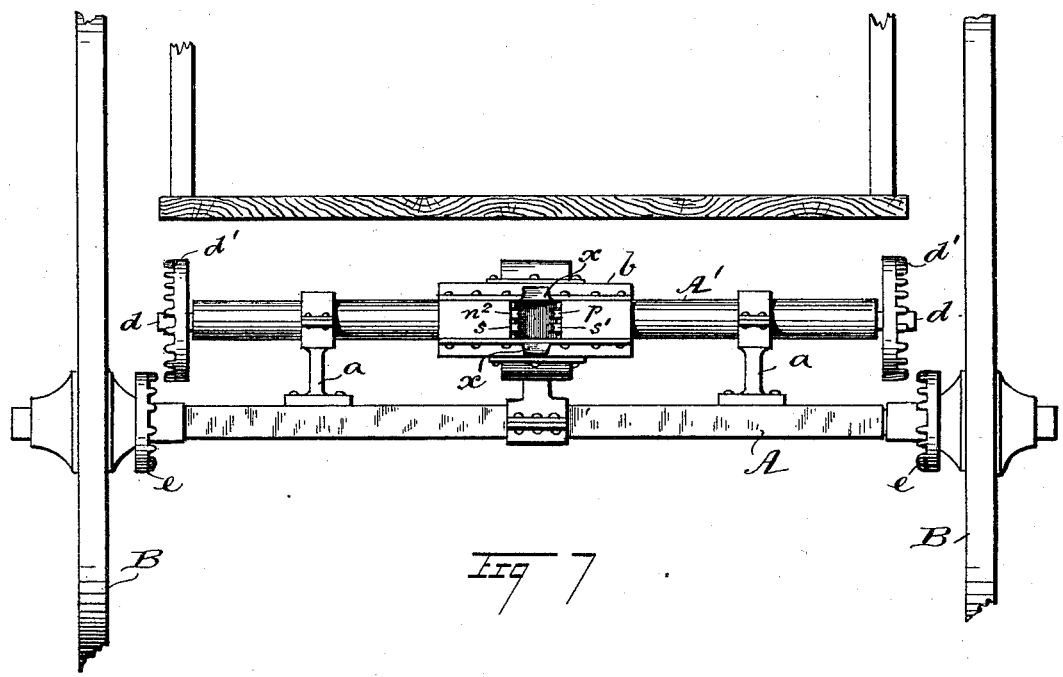
Figure 8:
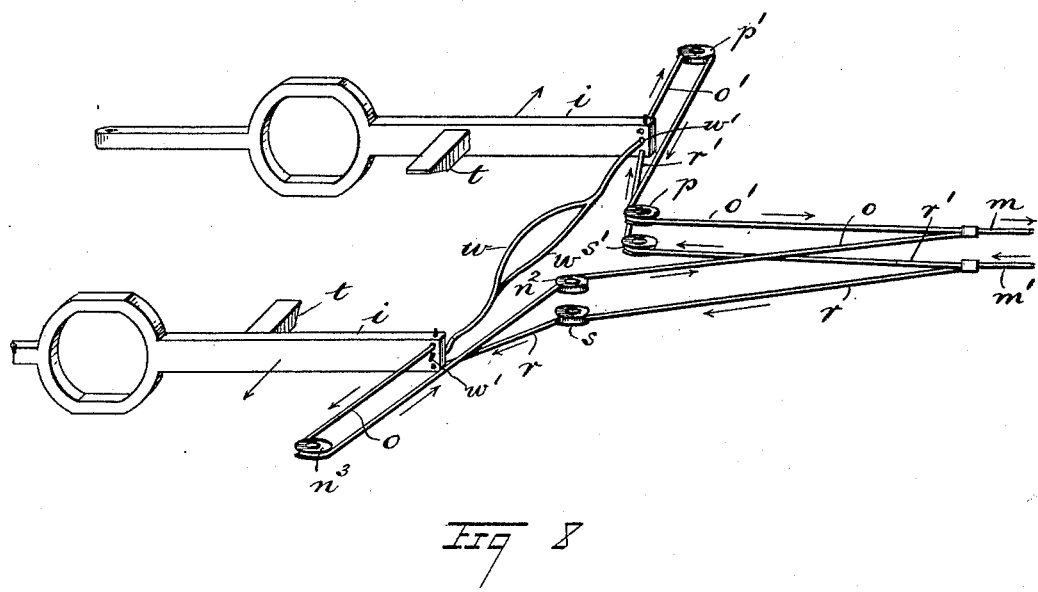

Figure 1 is a side elevation of a vehicle having the invention applied, taken on the line 1 1 in Fig. 2, and showing the manner of operating the mechanism. Fig. 2 is a plan view of the same, the pole of the wagon being broken away and the floor of the wagon-body partly removed above the mechanism of the arrester, the casing which incloses said mechanism being shown broken away and in section. Fig. 3 is a rear elevation of a rear wheel of the vehicle, a portion of the axle, and an adjacent portion of the arrester device. Fig. 4 is an enlarged detached plan view of the main portion of the arrester mechanism, the top of the casing which incloses the same being removed. Fig. 5 is a longitudinal sectional elevation of the mechanism shown in Fig. 4, taken on the line 5 5 in said figure. Fig. 6 is a transverse sectional elevation of the parts shown in Figs. 4 and 5, taken on the line 6 6 in Fig. 4. Fig. 7 is a front elevation of the rear axle and wheels of the vehicle with the arrester device in position thereon, a portion of the latter being in section on the line 7 7 in Fig. 2; and Fig. 8 is an enlarged diagram illustrating the construction of important parts of the mechanism and their relative arrangement and operation.

This horse-arresting device is applicable to any kind of a vehicle employed for transportation of persons or freight that is drawn by horses or other draft-animals. Its principal portions may be mounted upon the upper or lower side of the rear axle to engage the hubs of the rear vehicle-wheels. Preferably the device is arranged to be operated as is shown in the drawings.

Upon the rear axle A of the vehicle an elongated sleeve A' is revolubly mounted in the bearings $a$, which are secured on the axle A, and thus supports the sleeve in alignment with the axle and a suitable distance above it. Near the longitudinal center of the axle A a casing $b$, preferably made of sheet metal, is mounted upon the axle-body and clamped thereon, as shown in Fig. 7, the casing being separable into pieces to facilitate its construction and the introduction within it of parts of the mechanism it is designed to protect and support. As shown in Figs. 4, 5, and 6, the sleeve A' is extended through the side walls of the casing $b$, in which it is free to revolve. At about the center of length of the sleeve A' a pulley $c$ is secured thereon, which pulley has radial flanges $c'$ on its edges, said flanges having each a continuous series of ratchet-cut teeth $c^2$ formed on their peripheries, the teeth projecting outwardly from the sides of the pulley to be engaged by other parts, as will be explained. Within the sleeve A', which is bored throughout its length to render it of a true caliber, two shafts $d$ are introduced, which are made to fit revolubly therein, the length of the shaft being so proportioned to that of the sleeve A' and axle A that when their adjacent ends nearly touch each other the other ends, which project outside of the sleeve-terminals, will be adapted to receive the gear-wheels $d'$, that are secured in place thereon, with their laterally-projecting teeth near to but not in connection with similar toothed wheels $e$, which are attached to the inner ends of the hubs belonging to the vehicle-wheels B, that are loosely secured on the spindles of the axle A.

On the sleeve A', which should be a true cylinder and adjacent to the toothed flanges on the central pulley $c$, a hub $f$ is loosely mounted on each side of the pulley. The hubs $f$ are similar in form, and are each comprised of two equal sections that are secured together by laterally-inserted screw-bolts $f'$, which are oppositely located, and thus retain the hub-sections intact when this is desired. Each hub $f$ is provided with a radial flange on the outer edge of both of its sections, as at $f^2$ in Fig. 6, and upon the true cylindrical body of each hub, between the flanges thereon, a ring or band $g$ is placed, this being effected before the hub-sections are laterally secured together.

For the effective operation of the hubs $f$, in conjunction with other parts which will be described in their order, it is necessary that a longitudinal movement of the hubs be permitted while they are held secured to the end portions of the shaft $d$ and made to revolve with the sleeve at any point of sliding adjustment thereon. To effect the result mentioned, the sleeve $A'$ is longitudinally slotted, as at $h$ in Fig. 6. Opposite socket-holes are formed in each hub $f$ of suitable depth to engage the projecting ends of the keys $h'$, which keys are inserted through proper-sized transverse holes formed in the end portions of the shafts $d$ and fit closely therein, and as the socket-holes penetrate the hubs at their transverse centers they lie equally divided in each section of the hubs. Consequently the keys $h'$ that pass through the slots $h$ in order to engage the hub socket-holes, lock the hubs $f$ to the shaft ends and cause said hubs to rotate with the sleeve $A'$ and with both shafts $d$, while they are permitted to slide a limited distance on the sleeve in opposite directions. On the outer surface of the bands $g$, which are loosely supported on the hubs $f$, the laterally-apertured portions of levers $i$ are placed and pivotally secured by the set-screw bolts $i'$, which pass through elongated orifices made in these strap portions of the levers $i$ and enter tapped holes in the rings or bands $g$. The levers $i$ are extended toward the rear vertical wall of the casing $b$ and have a rocking engagement with the standing bolts $i^2$, and forwardly of the points of connection of the levers with the bands $g$ the bodies of the levers are projected toward the front wall of the casing, as represented in Figs. 4 and 5.

At a point on the foot-board $A^2$ of the wagon which will be most convenient for the driver to manipulate by an engagement of the same with his feet there is a rocking lever C, pivotally supported, said lever having two lateral limbs $k'$ $k^2$ extended oppositely from its main limb $k$, that projects upwardly and inclines outwardly from the driver at a proper angle for an easy engagement therewith of one foot of the driver, the other foot being placed on the end of the limb $k'$, which extends toward the seat of the vehicle. Upon the free ends of the limbs $k'$ $k^2$ the ends of stout cords $m$ $m'$, preferably made of twisted wire, are attached, said cords being rearwardly extended upon proper supports from the wagon-body, as at $m^2$, until their rear ends are adjacent to the casing $b$, where each cord is separated into two strands. (See Fig. 8.)

On the front wall of the casing $b$ forwardly-curved projections $n$ are produced (see Fig. 4) for the reception of vertical journal-posts $n'$, on each of which are secured two spaced grooved pulleys. (More plainly represented in Fig. 8.) At the front outer corners of the casing $b$ semicircular projecting pockets are produced, in each of which a grooved pulley $p'$ is pivotally supported on a standing stud. One strand $o$ of the bifurcated cord $m$, that is connected to the limb $k'$ of the rocking lever C, is laterally and diagonally extended to engage the upper grooved pulley $n^2$ on one of the posts $n'$, thence outwardly to pass partly around the grooved pulley $n^3$, which is located in one of the corner-pockets of the casing $b$, and thence the strand $o$ is extended toward the forward end of the adjacent lever $i$, to which it is secured. The other strand $o'$ of the cord $m$ is wrapped partly around the upper grooved pulley $p$ of the pair which is opposite the pulley $n^2$, thence extends outwardly to engage the grooved periphery of the pulley $p'$, and thence inwardly, and its end is attached to the other lever $i$ of the pair previously described.

Referring to the remaining leading-cord $m'$, that is attached by its forward end to the limb $k^2$ of the rocking lever C, and is bifurcated to produce two strands $r$ $r'$, it will be seen that the strand $r$ is passed partly around the grooved pulley $s$ below the pulley $n^2$, and thence directly to engage the end of the lever $i$ below the point where the strand $o$ is attached. The strand $r'$ is oppositely projected in a diagonal direction to engage the grooved pulley $s'$ below the pulley $p$, from which it extends toward and is attached to the front end of the lever $i$, to which the strand $o'$ is secured. It will be evident on inspection that a vibration of the lever C by the feet of the driver will rock the levers $i$ in a horizontal plane toward or from each other, and, further, that if the main limb $k$ of the lever C is pressed outwardly the connection established between the limbs $k'$ $k^2$ and the horizontal levers $i$ through the cords $m$ $m'$ will spread these levers $i$ and throw the gear-wheels $d'$ into connection with the similar wheels $e$ on the wheel-hubs, and so cause the shafts $d$, sleeve $A'$, and central pulley $c$ to revolve in the direction indicated by the arrow $v$ in Fig. 4. On the inner surface of each of the levers $i$ in front of the hubs $f$ a locking-toe $t$ is projected toward the ratchet-teeth $c^2$ on the flanges $c'$ of the pulley $c$, said toes being interlocked with these teeth when the levers $i$ are inwardly vibrated, which movement will be effected if the cord $m'$ is forwardly drawn by a depression of the limb $k'$ and consequent elevation of the integral limb $k^2$.

A substantial band $u$ is furnished for a connection of the arrester mechanism with the team of animals which draw the wagon. Preferably said band is made of leather, and has one end secured on the pulley $c$, around which it is designed to wrap when the pulley is actuated by a revolution of the sleeve A'. The band $u$ extends forwardly and is properly supported by its engagement with revoluble rollers journaled on the front running-gear of the vehicle, the extremity of the band having lateral straps $u'$ attached to it and also to the bits of the horses, so that a revoluble motion of the pulley $c$ in a direction away from the team of horses will shorten the band $u$ and pull the heads of the horses downward and rearward in a forcible manner, throwing the horses upon their haunches and arresting their forward movement quickly without injuring them or causing damage to the vehicle.

As it is desirable to retain a fractious team of horses with their heads trammeled in the manner described a sufficient length of time to completely subdue them, and as the reverse motion of the vehicle produced by a backing motion of the animals would release their heads by unwinding the band $u$, provision has been made to lock the pulley $c$ automatically in position after movement of the horses has been arrested, as above explained. To effect such a locking retention of the pulley $c$ until designedly released, a short doubled wire rope or strand $w$ is secured by its ends at $w'$ to the forward ends of the levers $i$, the strand extending across and above and below the band $u$. Upon the band $u$ at a proper point in advance of the casing $b$ a fork $w^2$ is attached, having prongs $w^3$, which extend above and below the band and are forwardly extended, so as to hook fast to the bight of the strand $w$, and by the rearward movement of the band draw the ends of the levers $i$ toward each other, as shown in Fig. 4, the guiding-lips $x$ of the casing causing the prongs to enter the same. (See Fig. 5.) When the levers $i$ are drawn inwardly, as just stated, the locking-toes $t$ are caused to interlock with the ratchet-teeth $c^2$, projecting from the flanges $c'$ of the pulley $c$ so that said pulley is prevented from rotation in a forward direction, which would relax the band $u$, the inclination of the ratchet-teeth $c^2$ being adapted to cause such a locking-connection of the parts; and when it is desired to release the draft strain which is thus produced upon the heads of the horses it is only necessary to rock the lever C outwardly by a pressure of the foot of the operator thereon.

If the arrester is to be attached to a one-horse vehicle, the band $u$ is sufficiently shortened to permit a proper attachment of leading cords or straps $u'$ to its front terminal end, which straps are laterally extended and then forwardly led to a connection with the bridle-bit on each side of the same, whereby the course of a runaway horse may be at once arrested if the arrester mechanism is put into service, as previously explained.

Having fully described my invention, I claim as new and desire to secure by Letters Patent—

1. In a horse-arrester, the combination, with a slotted sleeve revolubly mounted on a vehicle-axle, a casing on the axle through which the sleeve passes, shafts in the sleeve, sliding flanged hubs on the sleeve and keyed to the shafts through the slots of the sleeve, and encircling bands loosely mounted on the sliding hubs, of a central pulley on the sleeve, a flexible band on the pulley, levers pivoted on the casing and to the bands on the sliding hubs, and means, substantially as shown and described, for vibrating said levers from the front of the vehicle, substantially as set forth.

2. In a horse-arrester, the combination, with a vehicle-axle having wheels thereon and gear-wheels on the inner ends of the hubs of the vehicle-wheels, of a casing on the axle, a revoluble slotted sleeve supported on the axle, shafts within the sleeve, gear-wheels on the outer ends of the shafts, flanged hubs on the sleeve and keyed to the shafts through the slots of the sleeve, a central pulley on the sleeve, a flexible band on the pulley, horizontal levers pivoted to the casing and having loose engagement with rings or bands on the flanged hubs, and mechanism, substantially as shown and described, adapted to be operated from the seat of the vehicle for vibrating said levers and sliding the hubs and attached shafts toward or from the vehicle-wheels, substantially as set forth.

3. A horse-arrester comprising gear-wheels secured on the inner ends of the hubs of opposite wheels of a vehicle, a revoluble sleeve supported in alignment with the axle of said vehicle-wheels, shafts within the sleeve adapted to slide in and rotate with said sleeve, gear-wheels on the shafts adapted to engage the gear-wheels on the hubs of the vehicle-wheels, a central pulley secured on the sleeve, a band secured by one of its ends to the said central pulley and by its opposite end to the heads of horses attached to the vehicle, and mechanism, substantially as shown and described, adapted to be operated by the driver for moving the shafts endwise, interlocking the gear-wheels, revolving the pulley with the sleeve, and shortening the band wrapped on the central pulley, substantially as set forth.

4. In a horse-arrester, the combination, with a vehicle-axle having wheels thereon and gear-wheels on the hubs of the vehicle-wheels, of a sleeve revolubly mounted on the vehicle-axle, shafts in the sleeve adapted to revolve therewith and slide therein, gear-wheels on the outer ends of the shafts, a central pulley secured on the sleeve, a flexible band attached by one end to the pulley and by its opposite end to the heads of animals attached to the vehicle, and a rocking lever on the vehicle foot-board, flexibly connected to mechanism, substantially as shown and described, engaging the shafts and adapted to be operated to slide them oppositely and interlock the gear-wheels on said shafts with the gear-wheels on the hubs of the vehicle-wheels when the rocking lever is forwardly vibrated, substantially as set forth.

5. In a horse-arrester, the combination, with a vehicle, a sleeve mounted on an axle of the vehicle, shafts in said sleeve adapted to slide therein and to rotate therewith, and gear-wheels on the outer ends of said shafts adapted to engage similar gear-wheels on the hubs of the vehicle-wheels, of a pulley secured on the sleeve near its center, a band on the pulley, a rocking lever on the front of the vehicle, sliding hubs on the sleeve, horizontal pivoted levers loosely engaging said hubs, keys connecting the sliding hubs with the shafts in the sleeve and sliding in slots in the sleeve, and flexible connections extending from the rocking lever to the vibrating horizontal levers, said levers being so connected as to throw the shafts outwardly when the rocking lever is pushed away from the driver and move them inwardly when said rocking lever is moved toward the driver, substantially as set forth.

6. In a horse-arrester, the combination, with a casing mounted on the vehicle-axle, a slotted sleeve revoluble in the casing, and revoluble shafts in the sleeve, of a central pulley fast on the sleeve, having ratchet-cut radial flanges on its edges, flanged sliding hubs on the sleeve having loose rings or bands between their flanges, said hubs being keyed to the shafts through the slots of the sleeve, and horizontal levers pivoted to the casing and rings or bands of the flanged hubs, and provided with locking-toes adapted to engage the rachet-cut flanges of the central pulley when moved toward said flanges, substantially as set forth.

ALBERT ZALUD.

Witnesses:
E. M. PROTEAN,
A. V. KNICKERBOCKER.